(12) United States Patent
Sato et al.

(10) Patent No.: US 6,614,476 B1
(45) Date of Patent: Sep. 2, 2003

(54) ARRANGEMENT OF PLURAL IMAGING DEVICES

(75) Inventors: Osamu Sato, Saitama (JP); Masahiro Nakata, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/310,737

(22) Filed: May 13, 1999

(30) Foreign Application Priority Data

May 15, 1998 (JP) .......................................... P10-133085

(51) Int. Cl.[7] .............................................. H04N 5/335
(52) U.S. Cl. ...................................... 348/294; 348/345
(58) Field of Search .............................. 348/345, 349, 348/353, 354, 294, 295, 297, 298, 311, 312, 315, 362, 366; 396/96; 354/402, 408

(56) References Cited

U.S. PATENT DOCUMENTS

| 5,594,501 A | * | 1/1997 | Suzuki ........................ 348/362 |
| 5,608,664 A | | 3/1997 | Mori |
| 5,731,864 A | * | 3/1998 | Hamada et al. .............. 396/121 |
| 5,740,477 A | | 4/1998 | Kosako et al. |
| 5,845,155 A | | 12/1998 | Nakata et al. |
| 6,377,305 B2 | * | 4/2002 | Onuki ........................ 348/345 |

FOREIGN PATENT DOCUMENTS

GB 2030417 4/1980

* cited by examiner

*Primary Examiner*—Tuan Ho
(74) *Attorney, Agent, or Firm*—Greenblum & Bernstein, P.L.C.

(57) ABSTRACT

An imaging device arrangement comprises a first imaging device unit and a second imaging device unit, which are mounted in parallel on a single IC chip board. A first wiring circuit, which is connected to the first imaging device unit, is formed on the IC chip board along a periphery of the first imaging device unit. A second wiring circuit, which is connected to the second imaging device unit, is formed on the IC chip board along a periphery of the second imaging device unit. The first and second wiring circuits are connected to common terminals, which are formed on the IC chip board.

9 Claims, 10 Drawing Sheets

FIG.3
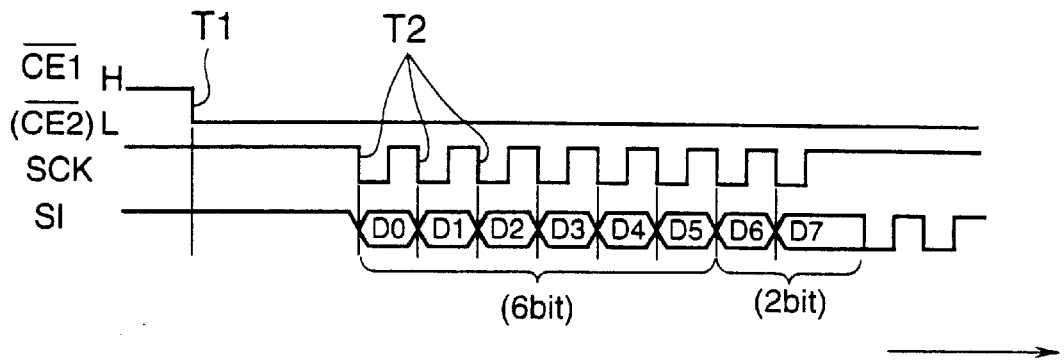
FIG.4
| MSB | | | | | | | LSB |
|---|---|---|---|---|---|---|---|
| 7 | 6 | 5 | 4 | 3 | 2 | 1 | 0 |
| 0 | 1 | $\phi$INT | FENDint | × | × | GAIN2 | GAIN1 |
FIG.5
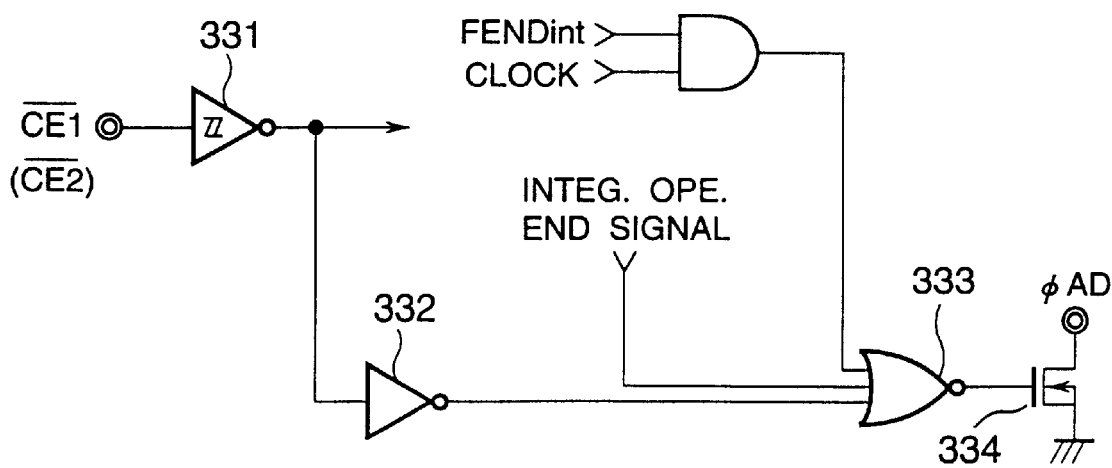

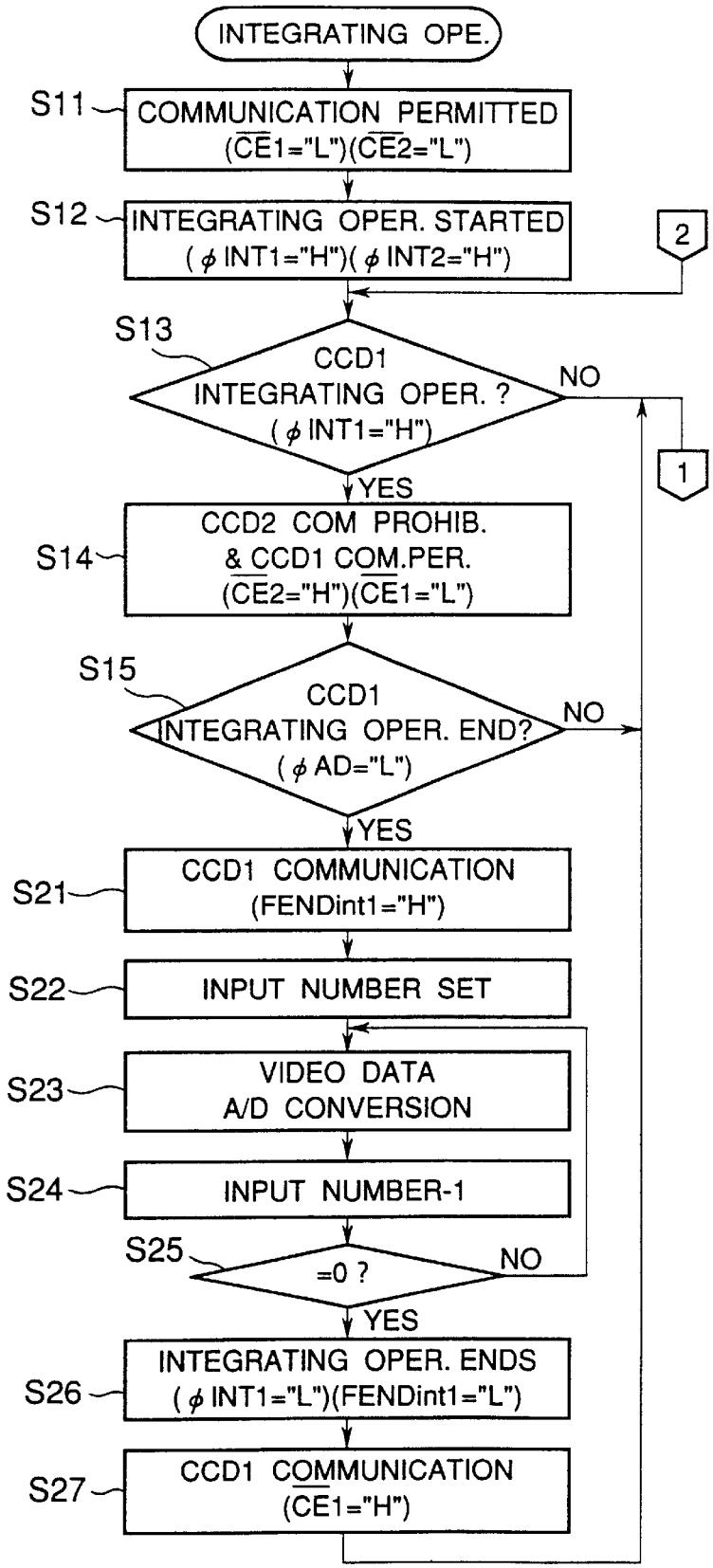

ARRANGEMENT OF PLURAL IMAGING DEVICES

BACKGROUND OF THE INVENTION

1. Field of the Invention

The present invention relates to an improvement of an arrangement of an imaging device, such as a CCD (charge coupled device), which is mounted in a camera to operate as a focus condition sensing device.

2. Description of the Related Art

Conventionally, there is known a focus condition sensing device which can perform a multi-point distance measurement, in which distances from the camera to a plurality of points on an object to be photographed are detected. The focus condition sensing device is constructed in such a manner that plural photo-diodes linearly aligned on a CCD chip, are divided into three light receiving lines, for example. Each of the light receiving lines is used for measuring a distance from the camera to a center, right or left portion of the object, for example, and in the view-finder, marks indicating the three distance measurement points corresponding to the center, right and left portions are provided.

The distance measurement points in the view-finder are determined in accordance with a structure of the photo-diodes provided in the CCD. Thus, if the number of the distance measurement points are to be increased, for example, the CCD chip and the optical system should be newly designed, resulting in an undesirable design time and increased cost.

SUMMARY OF THE INVENTION

Therefore, an object of the present invention is to provide an arrangement of a plurality of imaging devices, which are generally used for a camera, and which can be freely designed to change a number of distance measurement points. In other words, in the present invention, the imaging devices need not be redesigned in order to accommodate the number of distance measurement points.

According to the present invention, there is provided an imaging device arrangement comprising a first imaging device unit, a first wiring circuit that transmits the first control signal to the first imaging device unit, a second imaging device unit, a second wiring circuit and a single IC chip board.

The first imaging device unit is controlled in accordance with a first control signal so that an electric charge signal corresponding to an amount of light received by the first imaging device unit is generated and output from the first imaging device unit. The first wiring circuit transmits the first control signal to the first imaging device unit. The second imaging device unit is controlled in accordance with a second control signal so that an electric charge signal corresponding to an amount of light received by the second imaging device unit is generated and output from the second imaging device unit. The second wiring circuit transmits the second control signal to the second imaging device unit. The single IC chip board is provided with the first and second imaging device units and the first and second wiring circuits. The first and second wiring circuits are connected to each other and to a common terminal on the IC chip board.

Preferably, the first and second imaging device units are mounted in parallel to each other on the IC chip board, and the first and second wiring circuits are provided on peripheries of the first and second imaging device units.

Optionally, the first and second wiring circuits may be provided for applying an electric power source voltage to the first and second imaging device units. The first and second wiring circuits may be provided for grounding the first and second imaging device units, respectively.

Preferably, the IC chip board may be provided with a signal output terminal., by which the electric charge signal is output from the focus condition sensing device, and a control permission signal input terminal, by which a control permission signal that permits a control of the first and second imaging device units is input to the focus condition sensing device, and the first and second wiring circuits may be connected to a terminal other than the signal output terminal and the control permission signal input terminal.

Further preferably, the signal output terminal and the control permission signal input terminal may be connected to the first and second imaging device unit, respectively. The first imaging device unit may comprise a first imaging device control circuit and a first timing generation and driver circuit, which are operated in accordance with the first control signal, and the second imaging device unit may comprise a second imaging device control circuit and a second timing generation and driver circuit, which are operated in accordance with the second control signal.

Further, according to the present invention, there is provided an imaging device arrangement comprising a single IC chip board provided with a common terminal, a first imaging device unit mounted on the IC chip board, a first wiring circuit, a second imaging device mounted on the IC chip board, and a second wiring circuit.

The first imaging device unit is controlled in accordance with a first control signal to generate a first video signal. The first wiring circuit supplies the first control signal to the first imaging device unit. The first wiring circuit is connected to the common terminal. The second imaging device unit is controlled in accordance with a second control signal to generate a second video signal. The second wiring circuit supplies the second control signal to the second imaging device unit. The second wiring is connected to the common terminal.

BRIEF DESCRIPTION OF THE DRAWINGS

The objects and advantages of the present invention will be better understood from the following description, with reference to the accompanying drawings in which:

FIG. 3 is a timing chart of a serial communication, which is performed between a camera control circuit and a CCD control circuit of a CCD block;

FIG. 4 is a view showing an example of a control code of a serial communication;

FIG. 5 is a diagram showing a timing generation & driver circuit which outputs a timing signal ($\phi$AD) at an output terminal;

FIGS. 11A and 11B show a flow chart of a program, which is executed in the camera control circuit to perform the integrating operation.

DESCRIPTION OF THE PREFERRED EMBODIMENTS

Figure 1:
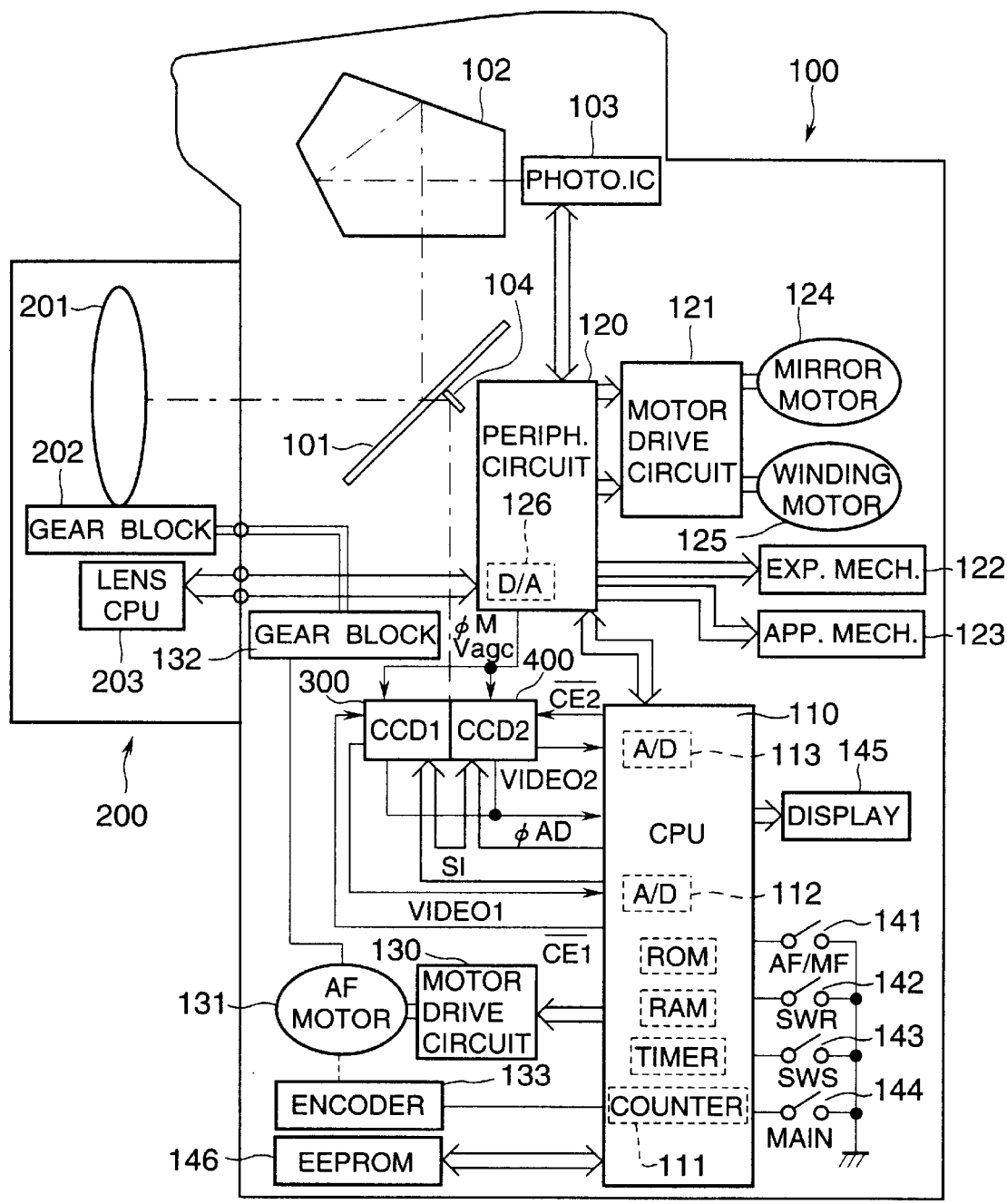
FIG. 1 is a block diagram of a camera in which a focus condition sensing device of an embodiment of the present invention is mounted.

The present invention will be described below with reference to embodiments shown in the drawings.

FIG. 1 shows an electrical construction of a camera in which a focus condition sensing device of an embodiment of the present invention is mounted.

A single-lens reflex camera has a camera body 100 and an interchangeable lens 200. In the camera body 100, a pentagonal prism 102, which is a part of a view finder optical system, is disposed above a quick return mirror 101. Light, passing through a photographing optical system 201, provided in the interchangeable lens 200, is led to an eyepiece lens of the view finder optical system through the quick return mirror 101 and the pentagonal prism 102, while a part of the light enters a photometry IC 103. Further, the light passing through the photographing optical system 201 is reflected by a sub-mirror 104 provided on a lower surface of the quick return mirror 101, and is led to first and second CCD blocks 300 and 400, which form a focus condition sensing device and are disposed under the quick return mirror 101.

Circuits provided in the camera body 100 are controlled by a camera control circuit (CPU) 110 which comprises a microcomputer. The camera control circuit 110 is connected to a peripheral circuit 120. The photometry IC 103, a motor drive circuit 121, an exposure mechanism 122 and an aperture mechanism 123 are directly connected to the peripheral circuit 120. The motor drive circuit 121 drives a mirror motor 124, which changes an inclination angle of the quick return mirror 101, and a winding motor 125, which winds a film (not shown). The exposure mechanism 122 operates a shutter (not shown) and adjusts an opening degree of the aperture (not shown).

Another motor drive circuit 130, which is connected to the camera control circuit 110, drives an AF motor 131, to which a gear block 132 is connected. The gear block 132 is coupled to a gear block 202, which is disposed in the interchangeable lens 200, through a joint mechanism (not shown). Due to the gear block 202, a part of lens groups included in the photographing optical system 201 can be moved along an optical axis thereof, so that a focus condition of the object to be photographed is adjusted. A lens control circuit (lens CPU) 203 is provided in the interchangeable lens 200 to transfer information, which is inherent to the interchangeable lens, between the camera body 100 and the interchangeable lens 200 so that an automatic focusing (AF) adjustment is carried out. On the other hand, an encoder 133 is connected to an output shaft of the AF motor 131, and pulse signals output from the encoder 133 are counted by a counter 111 provided in the camera control circuit 110, so that an amount of displacement of the lens is obtained.

A D/A converter 126 is provided in the peripheral circuit 120, and an AGC level signal (Vagc) is input to each of the first and second CCD blocks 300 and 400 through the D/A converter 126, so that an output amplitude of a video signal of each of the first and second CCD blocks 300 and 400 is determined. Chip enabling signals ($\overline{CE1}$ and $\overline{CE2}$) which are control permission signals, by which a control of the first and second CCD blocks 300 and 400 is permitted, are supplied from the camera control circuit 110 to the CCD blocks 300 and 400. Video signals (VIDEO1 and VIDEO2) output from the first and second CCD blocks 300 and 400 are input to A/D converters 112 and 113 provided in the camera control circuit 110, so that the video signals are used for controlling the photographing optical system 201 to perform an automatic focusing. A timing signal ($\phi$AD) output from each of the first and second CCD blocks 300 and 400 is input to the camera control circuit 110, so that the timing signal is used for controlling an integrating operation end timing in each of the first and second CCD blocks 300 and 400, and a timing of A/D conversion of the camera control circuit 110. A serial signal (SI) is input to each of the first and second CCD blocks 300 and 400 from the camera control circuit 110, so that various kinds of control signals can be transmitted.

An automatic/manual focusing switch 141, a release switch 142, a photometry switch 143 and a main switch 144 are connected to the camera control circuit 110. The automatic/manual focusing switch 141 is provided for setting a focusing adjustment in one of an automatic control or a manual control. The release switch 142 is turned ON when fully depressing a shutter button (not shown), so that a photographing operation is performed. The photometry switch 143 is turned ON when partly depressing the shutter button, so that all of the circuits in the camera body 100 are activated. Further, by operating the photometry switch 143, photometry and distance measurement are performed. The main switch 144 is used for permitting operations of the camera.

A display device 145 and a non-volatile memory (EEPROM) 146 are connected to the camera control circuit 110. The display device 145 is provided for indicating a photographing mode, a shutter speed and so on. Data such as a correction coefficient, which is multiplied by a video signal output from the first and second CCD blocks 300 and 400, is stored in the EEPROM 146.

Figure 2:
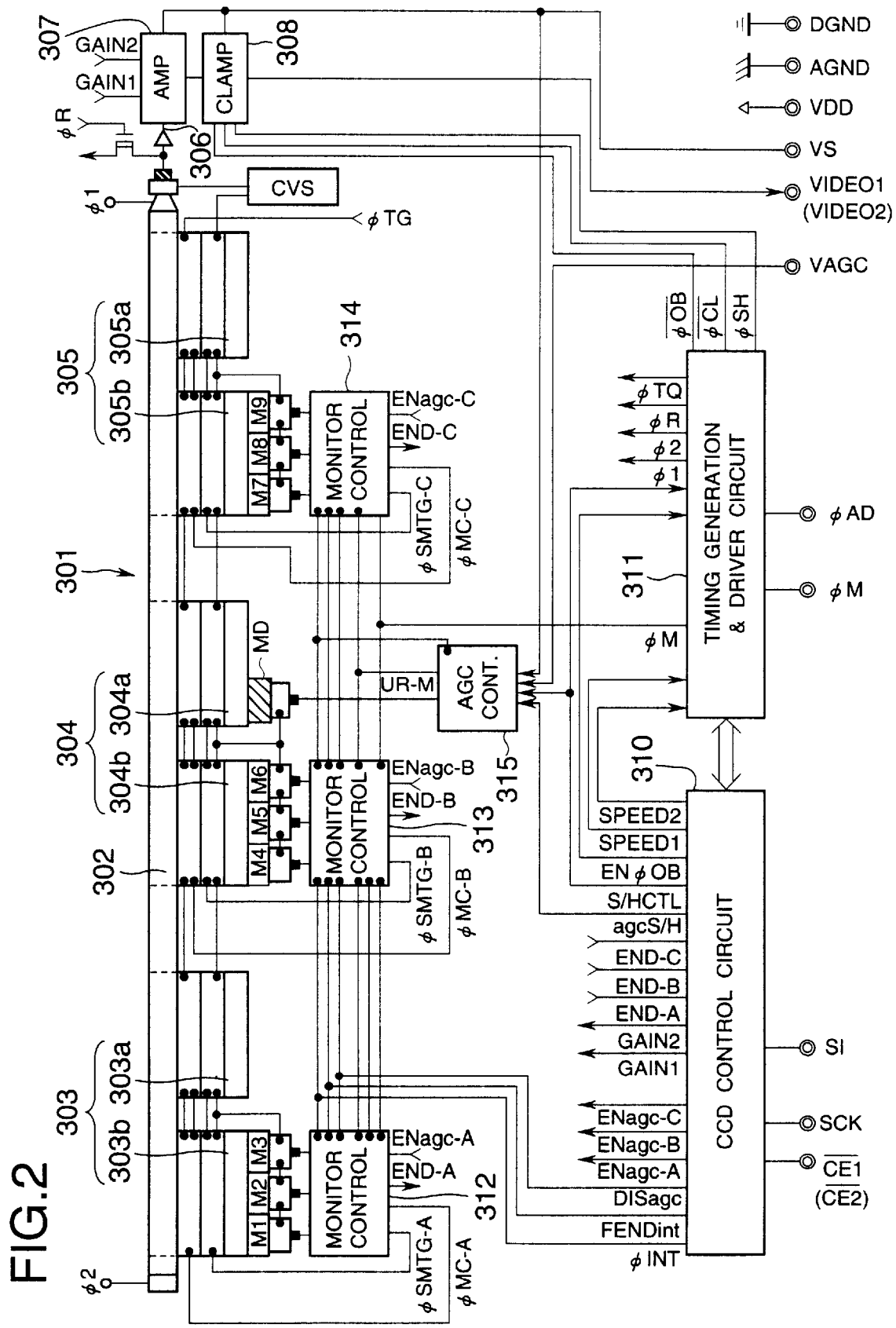
FIG. 2 is a block diagram of a first CCD block.

FIG. 2 shows a construction of the first CCD block 300. The first CCD unit 301 is a conventional CCD. Namely, a video signal (electric charge signal) corresponding to an amount of received light, is generated in and read from the CCD unit 301 in accordance with a first control signal. Such a construction is identical to the second CCD block 400. Namely, the second CCD unit is controlled by a second control signal, so that an electrical charge signal, corresponding to an amount of received light, is generated in and read from the second CCD unit. Note that the first and second control signals will be described later.

The first CCD unit 301 has a single transfer CCD 302, and three sensors 303, 304 and 305, which are separately arranged adjacent to the transfer CCD 302. Each of the sensors 303, 304 and 305 extends in a horizontal direction in the drawing, and is divided into a pair of light receiving elements 303a and 303b, 304a and 304b, or 305a and 305b.

Each of the sensors 303, 304 and 305 includes multiple photo-diodes (not shown), which are independently and linearly aligned in a single line strip, a storage element (not shown) in which an electric charge generated by the photo-diodes is accumulated, and a memory element (not shown), which temporarily stores the electric charge, accumulated in the storage element, after the integrating (accumulating) operation of the electric charge is completed. The electric charge, kept in the memory elements of the sensors 303, 304 and 305, is simultaneously transferred to the transfer CCD 302. In the transfer CCD 302, the electric charge (i.e., pixel signals) sensed by the sensors 303, 304 and 305 is transferred in accordance with a two-phase transfer clock signal (φ1 and φ2), and is output, pixel by pixel, from a read-out unit 306. Each pixel signal output from the read-out unit 306 is amplified by an amplifier 307, and is output from a clamp circuit 308 as a video signal (VIDEO1), which has a potential (or voltage) difference with respect to a standard level (VS).

Monitor sensors M1, M2 and M3, monitor sensors M4, M5 and M6, and monitor sensors M7, M8 and M9 are provided adjacent to the sensors 303, 304 and 305, respectively. A monitor dark sensor MD, which is isolated from ambient light, is disposed adjacent to the light receiving element 304a of the sensor 304. The monitor sensors M1 through M9 sense a brightness of the object to be photographed enabling a control of the integral period (i.e., end of integrating operation) in accordance with the brightness of the object. The monitor dark sensor MD obtains a signal, which is used for removing a dark current component detected by the monitor sensors M1 through M9.

An electric charge accumulation (i.e., an integrating operation) of each of the sensors 303, 304 and 305, a transfer of the electric charge (i.e., an integrating value generation) from each of the sensors 303, 304 and 305 to the transfer CCD 302, a transfer of electric charge in the transfer CCD 302, and a clamping operation in the clamp circuit 308 are controlled in accordance with clock, signals output from a CCD control circuit 310 and a timing generation & driver circuit 311. Output signals of the monitor sensors M1, M2 and M3 are used for controlling a monitor control circuit 312. Similarly, output signals of the monitor sensors M4, M5 and M6 are used for controlling a monitor control circuit 313, and output signals of the monitor sensors M7, M8 and M9 are used for controlling a monitor control circuit 314. The dark sensor MD is used for controlling an AGC control circuit 315. The integrating operations of the sensors 303, 304 and 305 are controlled, by the monitor control circuits 312, 313 and 314, and the AGC control circuit 315.

An integrating operation start signal (φINT), output from the CCD control circuit 310, is used for controlling a start of an integrating operation in each of the sensors 303, 304 and 305. An integrating operation control signal (FENDint), output from the CCD control circuit 310, is used for transferring electric charge from the sensors 303, 304 and 305 to the transfer CCD 302 after the integrating operation. Gain signals (GAIN1 and GAIN2) output from the CCD control circuit 310 are 2-bit signals, and are used for determining an amplification factor of the amplifier 307. Thus, four kinds of amplification factors can be set due to the gain signals.

The chip enabling signal ($\overline{CE1}$), a serial clock signal (SCK) and a serial input signal (SI), which are output from the camera control circuit 110 (see FIG. 1), are input to the CCD control circuit 310.

A standard clock signal (φM), output from the peripheral circuit 120, is input to the timing generation & driver circuit 311, and the timing signal (φAD), output from the timing generation & driver circuit 311, is input to the camera control circuit 110. Note that the references (VDD), (AGND) and (DGND) indicate a power supply voltage, an analog ground and a digital ground, respectively. The other references shown in the drawing are not related to the embodiment, and therefore the descriptions thereof are omitted.

FIG. 3 shows a timing chart of a serial communication, which is performed between the camera control circuit 110 and the CCD control circuit 310 of the CCD block 300.

When the chip enabling signal ($\overline{CE1}$) is changed from a high condition "H" to a low condition "L" (reference T1), a communication becomes enabled between the camera control circuit 110 and the CCD block 300. Then, the serial clock signal (SCK) is periodically changed between "H" and "L". In synchronization with a change from "H" to "L" (reference T2), 8-bit serial data (D0, D1, . . . D7), which are "1" or "0", are input in this order to a serial input terminal of the CCD block 300.

In the serial input data (D0, D1, . . . D7), the data (D0) corresponds to the least significant bit (LSB), and the data (D7) corresponds to the most significant bit (MSB). FIG. 4 shows an example of a control code of the serial communication. As shown in this drawing, the 2-bits of high-order data (D7 and D6) indicate addresses of a memory provided in the CCD control circuit 310, and the 6-bits of low-order data (D5, D4, . . . D0) are data stored in the addresses. The data (D5) indicates the integrating operation start signal (φINT), the data (D4) indicates the integrating operation control signal (FENDint), and the data (D1 and D0) indicate the gain signals (GAIN2 and GAIN1). Note that the data (D3 and D2) are dummy data and not used in this embodiment.

FIG. 5 shows a circuit which outputs the timing signal (φAD) at an output terminal of the timing generation & driver circuit 311. The chip enabling signal ($\overline{CE1}$), transmitted from the CCD control circuit 310, is inverted by a first inverter 331, and further inverted by a second inverter 332. An output terminal of the second inverter 332 is connected to a first input terminal of a NOR circuit 333. The inverted integrating operation end signal is input to a second input terminal of the NOR circuit 333, and a clock synchronization signal, output from an AND circuit 335, is input to a third input terminal of the NOR circuit 333. The integrating operation control signal (FENDint) and the clock synchronization signal are input to the AND circuit 335, and when the integrating operation control signal (FENDint) is "H", the clock synchronization signal is output by the AND circuit 335. The inverted integrating operation end signal is changed from "H" to "L" when a completion of the integrating operation is detected based on output signals of the monitor sensors M1 through M5. The output terminal of the NOR circuit 333 is connected to a gate of a switching device 334, and the timing signal (φAD) is generated in a drain of the switching device 334. Note that the output of the switching device 334 is of an open-drain type.

Thus, when the chip enabling signal ($\overline{CE1}$) is "L", the output signal of the first inverter 331 is "H" and the output signal of the second inverter 332 is "L". Namely, since the input signal of the first input terminal of the NOR circuit 333 is "L", an inverted clock synchronization signal is output from the NOR circuit 333 when the inverted integrating operation end signal is "L" and the integrating operation control signal (FENDint) is "H". The switching device 334 is an inverter, and therefore the clock synchronization signal, input to the NOR circuit 333, is output from the output terminal in a same state, as the timing signal (φAD). Conversely, when the chip enabling signal ($\overline{CE1}$) is "H", the output signal of the NOR circuit 333 is "L", so that the switching device 334 is set to an OFF state, and no signal is output from the output terminal of the switching device 334.

Figure 6:
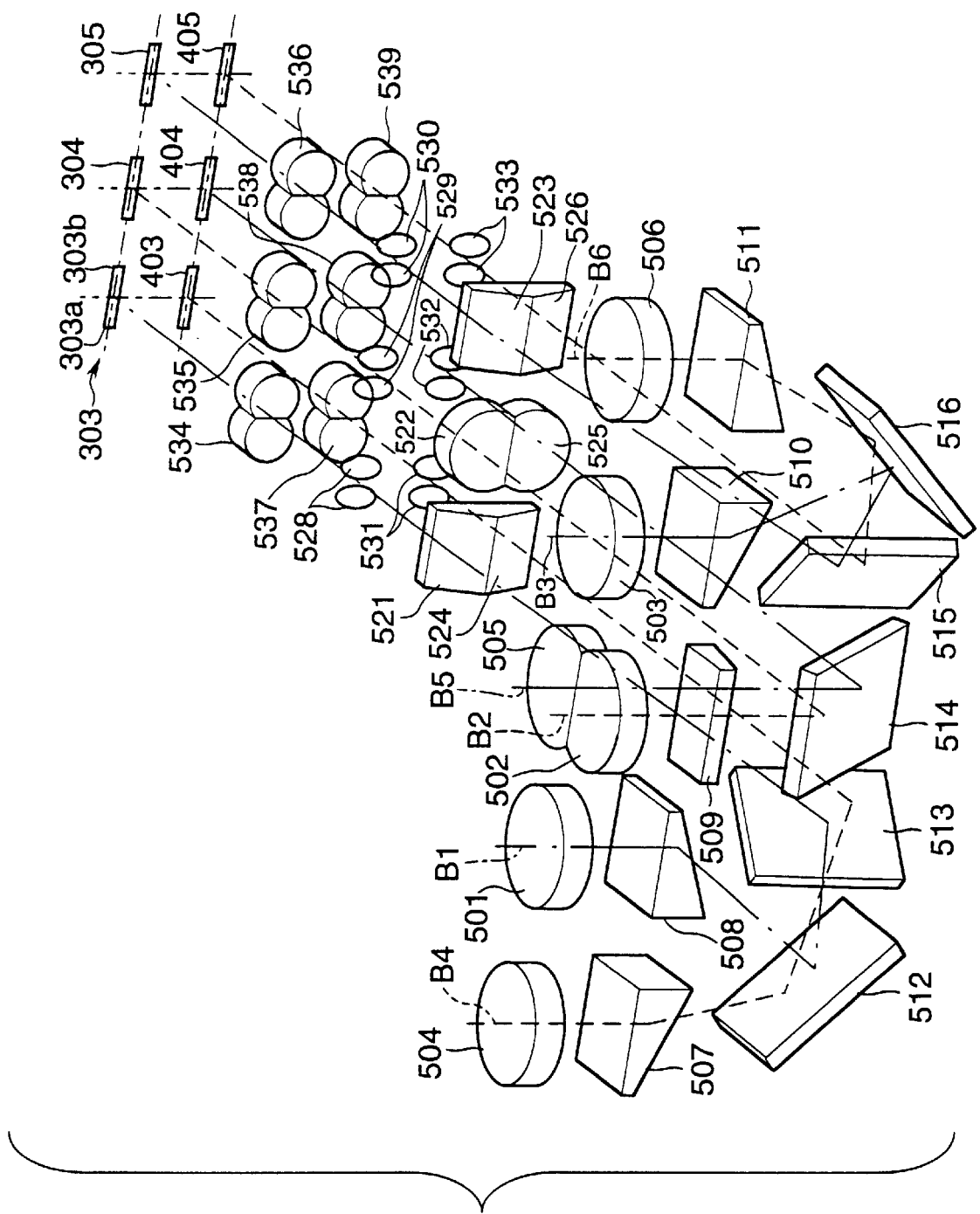
FIG. 6 is a perspective view showing a construction of optical systems for leading luminous fluxes, which pass through a photographing optical system and are reflected by a sub-mirror, to first and second CCD blocks.
Figure 7:
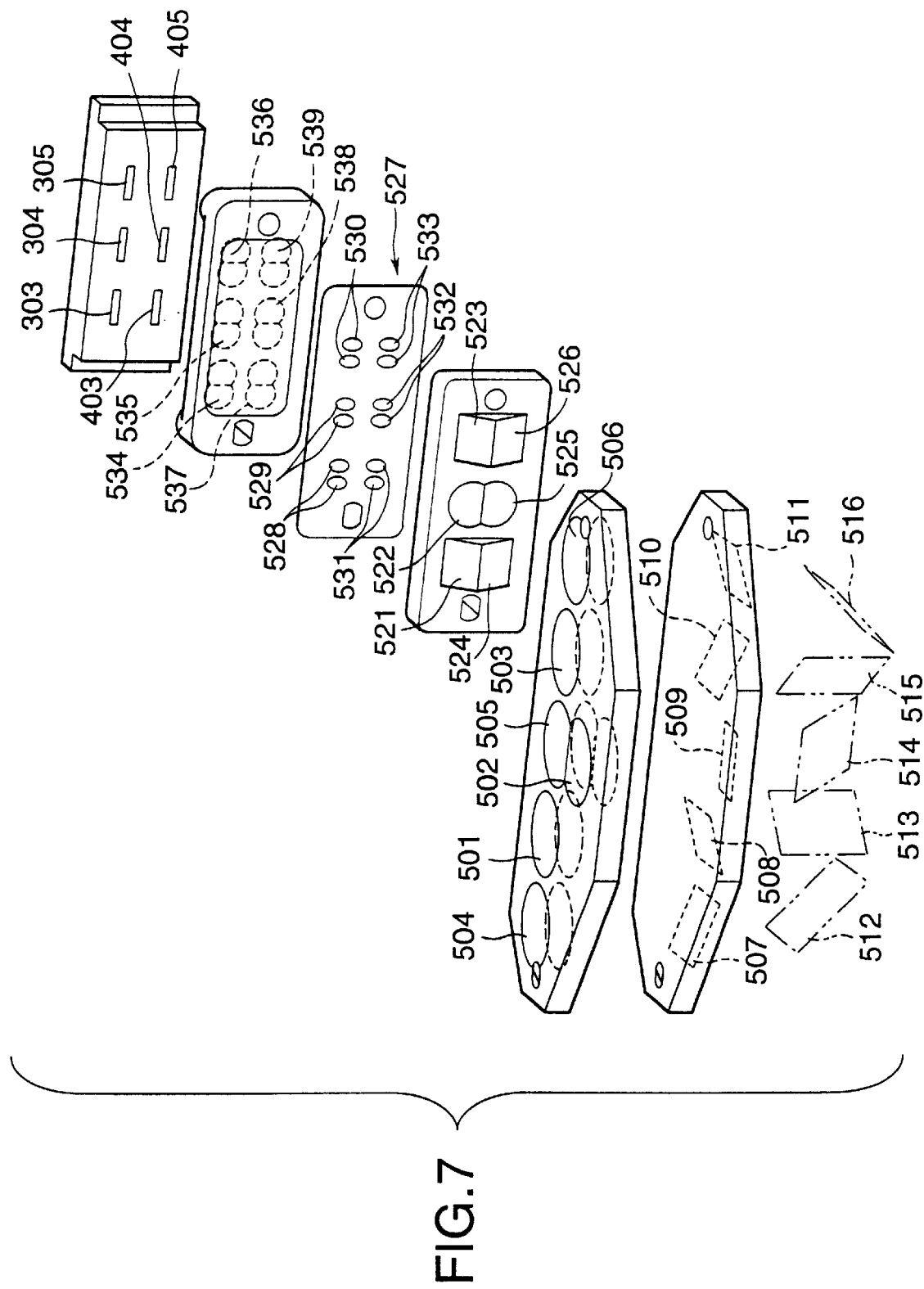
FIG. 7 is a perspective view showing members forming the optical systems shown in FIG. 6.

FIGS. 6 and 7 show a construction of optical systems, which lead luminous fluxes, passing through the photographing optical system 201 (see FIG. 1) and reflected by the sub-mirror 104 (see FIG. 1), to the first and second CCD units 301 and 401.

The luminous fluxes B1 through B6 reflected by the sub-mirror 104 are condensed by condenser lenses 501 through 506, and are led to mirrors 512 through 516 through prisms 507 through 511. These luminous fluxes B1 through B6 are further condensed by auxiliary lenses 521 through 526, pass through openings 528 through 533, and are led to separator lenses 534 through 539.

The luminous flux B1 is horizontally divided into two portions by the separator lens 534, and the divided luminous fluxes are led to the pair of light receiving elements 303a and 303b. Namely, the sensor 303 corresponds to a single distance measurement point, and a focus condition of the distance measurement point is sensed by the light receiving elements 303a and 303b. Similarly, each of the other luminous fluxes B2 through B6 is horizontally divided into two parts by the separator lenses 535,. 536, 537, 538 and 539, respectively, and led to each of the sensors 304, 305, 403, 404, and 405, respectively, so that a focus condition of the corresponding distance measurement point is sensed.

The sensors 303 through 305 are formed on the first CCD unit 301, and the sensors 403 through 405 are formed on the second CCD unit 401.

Figure 8:
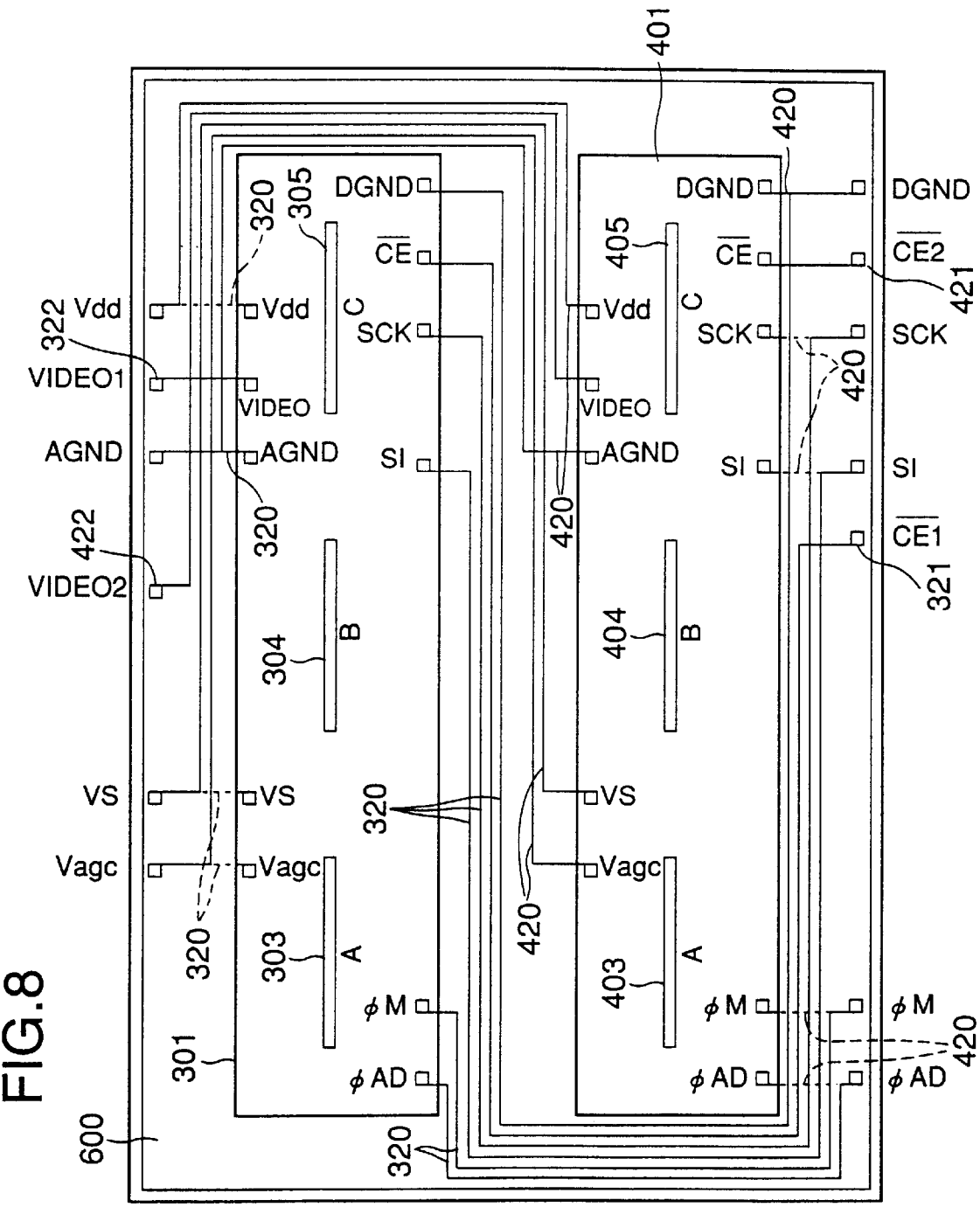
FIG. 8 is a plan view showing the first and second CCD units, and wiring circuits provided therearound.
Figure 9:
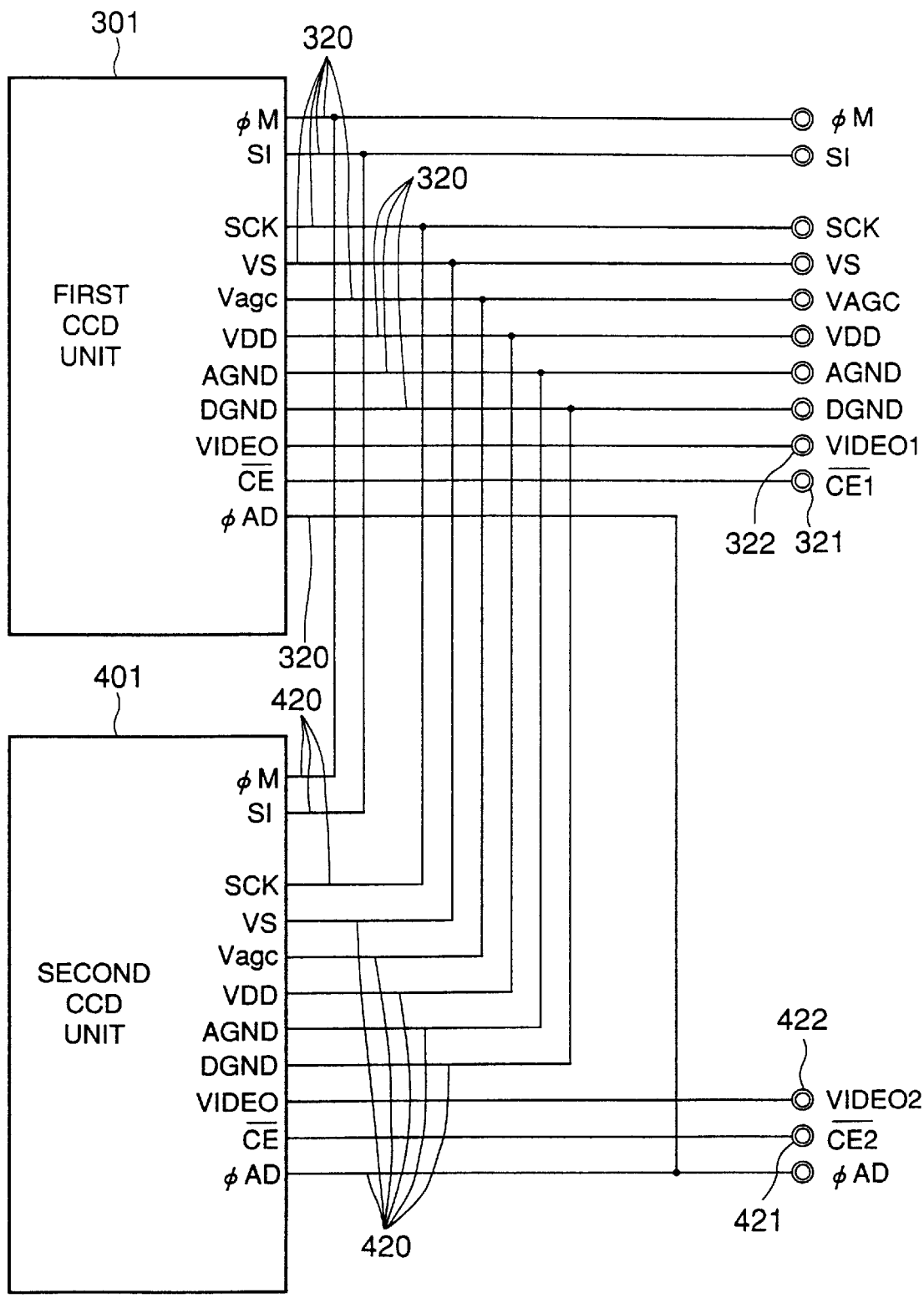
FIG. 9 is a block diagram showing the wiring circuits connected to terminals of the first and second CCD units.

FIG. 8 shows the first and second CCD units 301 and 401 in parallel, and wiring circuits provided therearound. FIG. 9 is a block diagram showing the wiring circuits connected to terminals of the first and second CCD units 301 and 401.

The first and second CCD units 301 and 401 are mounted in parallel to each other on a single IC chip board 600, where a first wiring circuit 320, connected to the first CCD unit 301, and a second wiring circuit 420, connected to the second CCD unit 401, are provided along peripheries of the CCD units 301 and 401, respectively.

The first wiring circuit 320 is provided for transmitting the timing signal ($\phi$AD), the serial input signal (SI), the serial clock signal (SCK), the standard level signal (VS), and the AGC level signal (Vagc) by which the output level of the video signal is determined, and the standard clock signal ($\phi$M), which is output from the peripheral circuit 120, among the first CCD unit 301, the camera control circuit 110, and the peripheral circuit 120. The first wiring circuit 320 is further provided for applying the power source voltage (VDD) to the first CCD unit 301, and connecting the first CCD unit 301 to the analog ground (AGND) and the digital ground (DGND). The second wiring circuit 420 has a similar function to that of the first wiring circuit 320, and, therefore, the descriptions thereof are omitted.

The first and second wiring circuits 320 and 420 are connected to each other on the IC chip board 600, and are connected to bonding pads so that signals are output from the IC chip board 600. Namely, the bonding pads are provided for transmitting the timing signal ($\phi$AD) from the first and second CCD units 301 and 401 to the camera control circuit 110, for transmitting the serial input signal (SI), the serial clock signal (SCK) and the standard level signal (VS) from the camera control circuit 110 to the first and second CCD units 301 and 401, for supplying the standard clock signal ($\phi$M) and the AGC level signal (Vagc) from the peripheral circuit 120 to the first and second CCD units 301 and 401, and for connecting the analog ground (AGND) and the digital ground (DGND) to the first and second CCD units 301 and 401.

The standard clock signal ($\phi$M), the serial input signal (SI), the serial clock signal (SCK), the standard level signal (VS) and the AGC level signal (Vagc) are control signals by which a video signal, corresponding to an amount of received light, is integrated in each of the first and second CCD units 301 and 401 before being output therefrom. Note that, in this specification, a signal for controlling the first CCD unit 301 is referred to as a first control signal, and a signal for controlling the second CCD unit 401 is referred to as a second control signal. Conversely, the timing signal ($\phi$AD) indicates the end of the integrating operation in each of the first and second CCD units 301 and 401, and is a third signal for controlling a timing of an A/D conversion in the camera control circuit 110.

The first CCD unit 301 becomes controllable due to the chip enabling signal ($\overline{CE1}$) and the second CCD unit 401 becomes controllable due to the chip enabling signal ($\overline{CE2}$). These chip enabling signals ($\overline{CE1}$ and $\overline{CE2}$) are independently input to the first and second CCD units 301 and 401, respectively, through first and second control permission signal input terminals 321 and 421. The video signals (VIDEO1 and VIDEO2) independently output from the first and second CCD units 301 and 401, respectively, are output from the focus condition sensing device through first and second signal output terminals 322 and 422.

Thus, the control permission signal input terminals 321, 421 and the signal output terminals 322, 422 are provided for inputting and outputting signals other than the first, second and third control signals. In other words, the first and second wiring circuits 320, 420 for transmitting these first, second and third control signals are connected to common terminals other than the control permission signal input terminals 321, 421 and the signal output terminals 322, 422. Namely, the common terminals are commonly provided for the first, second and third control signals.

Figure 10:
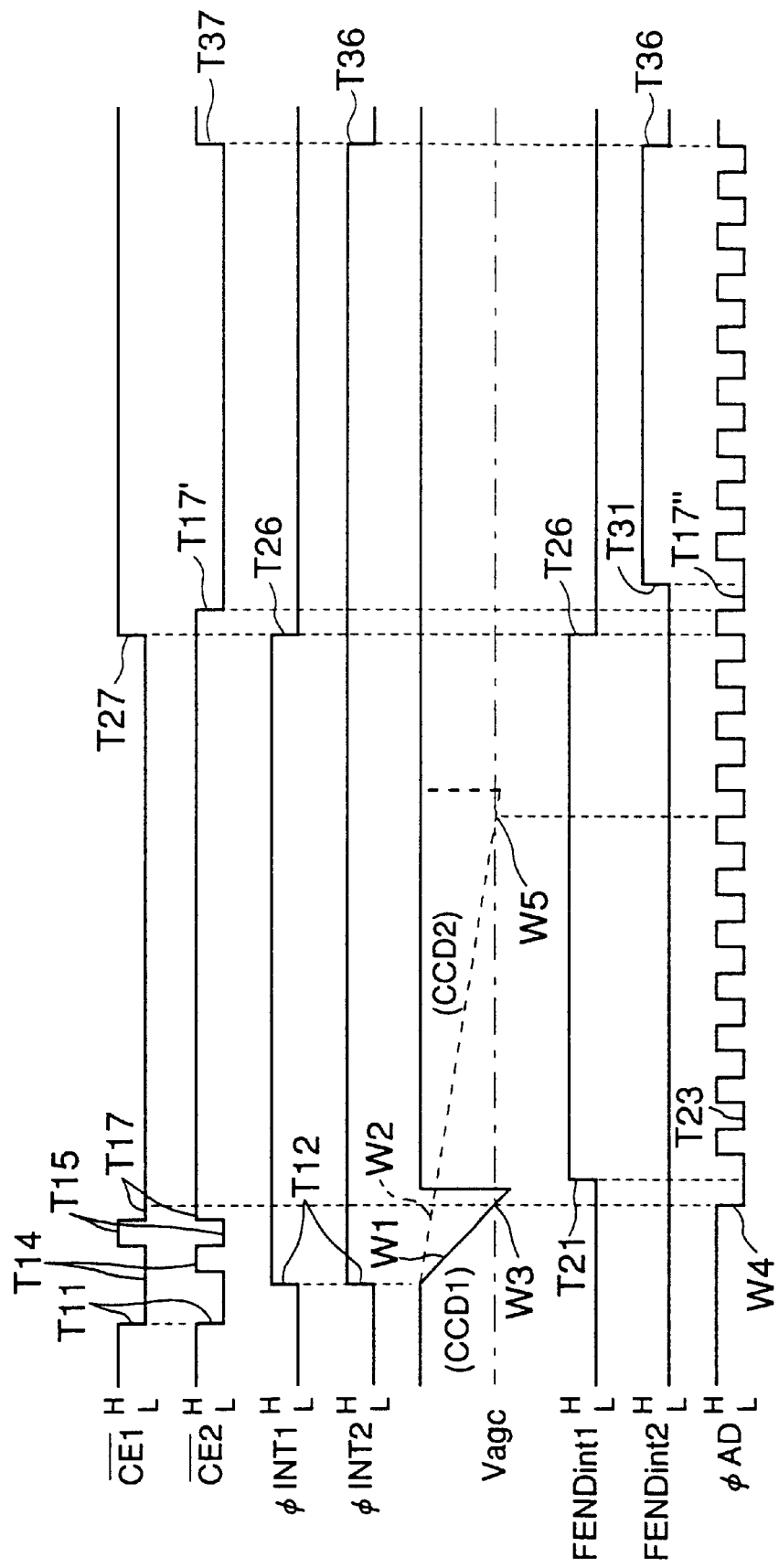
FIG. 10 is a timing chart indicating a control of the integrating operation of each of the first and second CCD units.
Figure 11B:
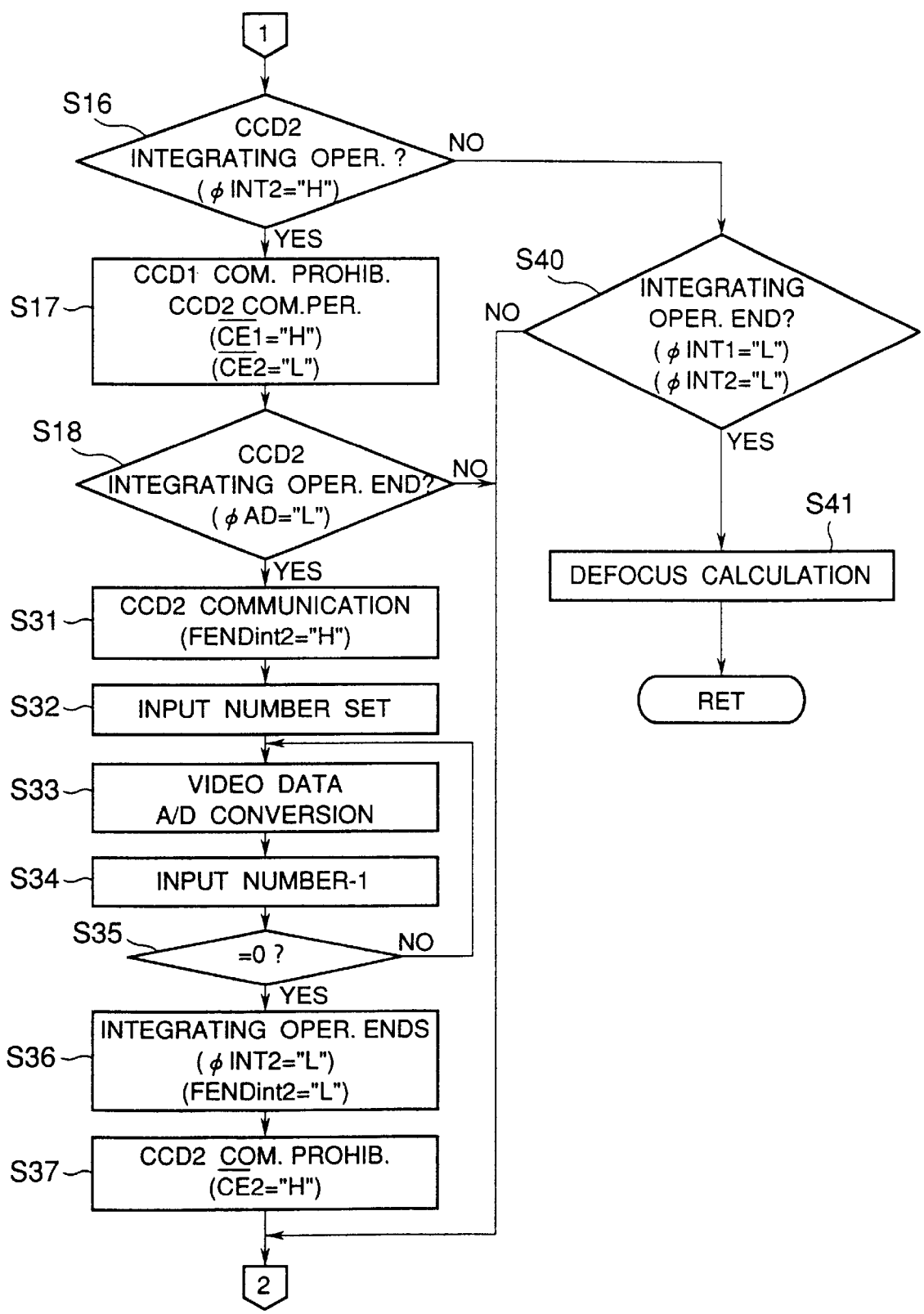

FIG. 10 is a timing chart indicating a control of the integrating operation (i.e., electric charge accumulating operation) of each of the first and second CCD units 301 and 401. FIGS. 11A and 11B show a flow chart of a program, which is executed in the camera control circuit 110 to perform the integrating operation. With reference to these drawings, an operation of the embodiment is described below.

In Step S11, each of the chip enabling signals ($\overline{CE1}$ and $\overline{CE2}$) is set to "L" (reference T11), so that communication to the first and second CCD units 301 and 401 is permitted. In Step S12, each of the integrating operation start signals ($\phi$INT1 and $\phi$INT2) is set to "H". The integrating operation start signals are serially input from the camera control circuit 110, as described above with reference to FIGS. 3 and 4. Due to the integrating operation start signals ($\phi$INT1 and $\phi$INT2), integrating operations of electric charge signals, i.e., accumulations of the electric charges, are started in the first and second CCD units 301 and 401 (reference T12). Further, due to the integrating operation start signals ($\phi$INT1 and $\phi$INT2), accumulations of electric charges in the first and second monitors (i.e., photo-diodes and not shown) are started, and output levels of these monitors start to lower (references W1 and W2). Note that the output level W1 of the first monitor corresponds to the video signal of the first CCD unit 301, and the output level W2 of the second monitor corresponds to the video signal of the second CCD unit 401.

In Step S13, it is determined whether the integrating operation is being carried out in the first CCD unit 301, i.e., whether the integrating operation start signal ($\phi$INT1) for the first CCD unit 301 is "H". The integrating operation start signal ($\phi$INT1) keeps "H" until the reading operation of the video signal from the first CCD unit 301 has been completed. Therefore, when Step S13 is executed for the first time, the integrating operation start signal ($\phi$INT1) is usually "H", and therefore Step S14 is executed, in which the chip enabling signals ($\overline{CE1}$ and $\overline{CE2}$) are set to "L" and "H", respectively (reference T14). As a result, communication to the second CCD unit 401 is prohibited, and communication to the first CCD unit 301 is permitted.

In Step S15, it is determined whether the integrating operation in the first CCD unit 301 has been completed, i.e., whether the timing signal ($\phi$AD) is "L". The timing signal ($\phi$AD) and the inverted integrating operation end signal are changed from "H" to "L" (reference W4) when the output level W1 of the monitor exceeds the AGC level signal (reference W3). Note, the reason the monitor output W1 is checked while the monitor output W2 is not checked is that $\overline{CE1}$="L" and $\overline{CE2}$="H". Namely, as understood from the description regarding FIG. 5, the terminal of the timing signal (φAD) of the second CCD unit 401 becomes high-impedance when $\overline{CE2}$="H", and thus no signal is output from the terminal. When Step S15 is executed for the first time, the integrating operation of the first CCD unit 301 has yet to be completed, and thus Step S16 is then executed.

In Step S16, it is determined whether the integrating operation is being performed in the second CCD unit 401, i.e., whether the integrating operation start signal (φINT2) is "H". When Step S16 is executed for the first time, the integrating operation start signal (φINT2) is still "H", and therefore, Step S17 is executed, in which the chip enabling signals ($\overline{CE1}$ and $\overline{CE2}$) are set to "H" and "L", respectively (reference T15). As a result, communication to the first CCD unit 301 is prohibited, and communication to the second CCD unit 401 is permitted.

In Step S18, it is determined whether the integrating operation in the second CCD unit 401 has been completed, i.e., whether the timing signal (φAD) is "L". Note that, since $\overline{CE2}$="L" and $\overline{CE1}$="H", the timing signal (φAD) is changed from "H" to "L" when the monitor output W2 exceeds the AGC level signal (Vagc). When Step S18 is executed for the first time, the integrating operation in the second CCD unit 401 has not usually been completed, and therefore Step S13 is then executed.

Thus, Steps S13 through S18 are repeatedly executed, so that the chip enabling signals ($\overline{CE1}$ and $\overline{CE2}$), which are the control permission signals, are switched between "H" and "L" several times (reference T17). During these operations, when the monitor output W1 or W2 exceeds the AGC level signal (reference W3), the timing signal (φAD) is changed from "H" to "L" (reference W4). In the drawing, since the timing signal (φAD) is changed from "H" to "L" due to the monitor output W1 regarding the first CCD unit 301, exceeding the AGC level signal (reference W3), the process goes from Step S15 to Step S21. Then, Steps S21 through S27 are executed, so that the integrating operation of the first CCD unit 301 is completed, and the video signal is output to the camera control circuit 110.

In Step S21, the integrating operation control signal (FENDint1) regarding the first CCD unit 301 is changed to "H" (reference T21). The integrating operation control signal (FENDint1) is serially input from the camera control circuit 110 to the first CCD unit 301 under the serial communication, in a similar way as the integrating operation start signal (see FIGS. 3 and 4). Due to the integrating operation control signal (FENDint1), the integrating operation in the first CCD unit 301 ends, and an output operation of the video signal to the camera control circuit 110 is started.

First, in Step S22, a number of video signals (i.e., a number of pixels) obtained by each of the sensors 303, 304 and 305 of the first CCD unit 301, i.e., an input number corresponding to the number of pixels, which should be read by the camera control circuit 110, is set. In Step S23, one pixel video signal (VIDEO data) is A/D-converted in the camera control circuit 110 (reference T23). In Step S24, 1 is subtracted from the input number. In Step S25, it is determined whether the input number has reached 0, i.e., whether all of the video signals have been output from the first CCD unit 301. When all of the video signals have yet to be output, Step S23 is executed again.

When all of the video signals have been output by the execution of Steps S23, S24 and S25, the process moves from Step S25 to Step S26, in which the integrating opera-tion start signal (φINT1) and the integrating operation control signal (FENDint1) regarding the first CCD unit 301 are changed from "H" to "L" (reference T26). Then, in Step S27, the chip enabling signal ($\overline{CE1}$) regarding the first CCD unit 301 is changed from "L" to "H" (reference T27). Thus, communication to the first CCD unit 301 is prohibited.

Then, Step S16 is again executed. Since the integrating operation start signal (φINT2) regarding the second CCD unit 401 is still "H", Steps S17 and S18 are executed in turn. In Step S17, the chip enabling signal ($\overline{CE2}$) regarding the second CCD unit 401 is changed to "L" (reference T17'). In the drawing, since the monitor output W2 exceeds the AGC level signal (reference W5) while the video signal is output from the first CCD unit 301, the integrating operation of the second° CCD unit 401 ends at this time. The timing signal (φAD) is changed to "L" at the same time the chip enabling signal ($\overline{CE2}$) is changed to "L" (reference T17"), in Step S17. Therefore, the process moves from Step S18 to Step S31. Conversely, when it is determined in Step S18 that the timing signal (φAD) is still "H", the process returns from Step S18 to Step S13.

In Step 531, the integrating operation control signal (FENDint2) regarding the second CCD unit 401 is changed to "H" (reference T31). Operations of Steps S32 through S35 are the same as those of Steps S22 through S25, and therefore the description thereof is omitted.

In Step S36, the integrating operation start signal (φINT2) and the integrating operation control signal (FENDint2) regarding the second CCD unit 401 are changed from "H" to "L" (reference T36). In Step S37, the chip enabling signal ($\overline{CE2}$) regarding the second CCD unit 401 is changed from "L" to "H" (reference T37). Thus, communication to the second CCD unit 401 is prohibited.

Then, since it is determined in Step S13 that the integrating operation start signal (φINT1) for the first CCD unit 301 is "L", the process goes to Step S16, in which it is determined that the integrating operation start signal (φINT2) for the second CCD unit 401 is also "L", and the process goes to Step S40. When the integrating operation of the second CCD unit 401 is completed earlier than in the first CCD unit 301, the integrating operation start signal (φINT1) is "H" and the integrating operation start signal (φINT2) is "L". Therefore, in Step S40, it is determined whether all of the integrating operations have been completed, i.e., whether both of the integrating operation start signals (φINT1 and φINT2) are "L". The process returns to Step S13 when the integrating operations have not been completed. Conversely, when all of the integrating operations have been completed, Step S41 is executed, in which a defocus calculation is carried out based on the video signals obtained by the first and second CCD units 301 and 401. Thus, the program ends.

As described above, in the embodiment, the integrating operations in the first and second CCD units 301 and 401 are started at the same :time, and then, when one of the integrating operations is completed, the video signals are output from the CCD unit 301 or 401 in which the integrating operation is completed. Namely, before the integrating operations of the first and second CCD units 301 and 401 are completed, the output of the video signals of one of the CCD units is started. Therefore, the period taken all of the video signals to be output is shortened as much as possible, and thus the operation of the focus condition sensing can be promptly carried out irrespective of a number of distance measurement points.

Further, even if the integrating operation is completed in a second CCD unit while video signals are still being output from a first CCD unit, output of the video signals of the second CCD unit is prohibited until the output of the video signals of the first CCD unit is completed. Therefore, signal processes to which the video signals are subjected are simpler in comparison with a construction in which video signals are simultaneously output from the two CCD units with being mixed up.

Furthermore, in the embodiment, the first and second CCD units 301, 401 and the first and second wiring circuits 320 and 420 are provided on the single IC chip board 600. Therefore, in the manufacturing process of the focus condition sensing device, two general-purpose CCD units can be arranged in parallel on the IC chip board 600 as the two CCD units 301 and 401, and the wiring circuits 320 and 420 can be formed on the periphery of the CCD units 301 and 401. In other words, CCD units need not be specially designed for the focus condition sensing device which has a specific number of distance measurement points. Accordingly, the design and the manufacture of the focus condition sensing device is simplified when requiring an increase in a number of distance measurement points.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-133085 (filed on May 15, 1998) which is expressly incorporated herein, by reference, in its entirety.

What is claimed is:

1. An imaging device arrangement, comprising:
a first imaging device unit that is controlled in accordance with a first control signal so that an electric charge signal corresponding to an amount of light received by said first imaging device unit is generated and output from said first imaging device unit;
a first wiring circuit that transmits said first control signal to said first imaging device unit;
a second imaging device unit that is controlled in accordance with a second control signal so that an electric charge signal corresponding to an amount of light received by said second imaging device unit is generated and output from said second imaging device unit;
a second wiring circuit that transmits said second control signal to said second imaging device unit; and
a single IC chip board provided with said first and second imaging device units and said first and second wiring circuits,
said first and second wiring circuits being connected to each other and to a common terminal on said IC chip board, said IC chip board being provided with a signal output terminal, by which said electric charge signal is output from a focus condition sensing device, and a control permission signal input terminal, by which a control permission signal that permits a control of said first and second imaging device units is input to the focus condition sensing device, said first and second wiring circuits being connected to a terminal other than said signal output terminal and said control permission signal input terminal.

2. An imaging device arrangement according to claim 1, wherein each of said first and second imaging device units comprises a plurality of light receiving portions, on which said light is incident.

3. An imaging device arrangement according to claim 1, wherein said first and second imaging device units are mounted in parallel to each other on said IC chip board, and said first and second wiring circuits are provided on peripheries of said first and second imaging device units.

4. An imaging device arrangement according to claim 1, wherein said first and second wiring circuits are provided for applying an electric power source voltage to said first and second imaging device units.

5. An imaging device arrangement according to claim 1, wherein said first and second wiring circuits are provided for grounding said first and second imaging device units, respectively.

6. An imaging device arrangement according to claim 1, wherein said signal output terminal and said control permission signal input terminal are connected to said first and second imaging device unit, respectively.

7. An imaging device arrangement according to claim 1, wherein said first imaging device unit comprises a first imaging device control circuit and a first timing generation and driver circuit, which are operated in accordance with said first control signal, and said second imaging device unit comprises a second imaging device control circuit and a second timing generation and driver circuit, which are operated in accordance with said second control signal.

8. An imaging device arrangement, comprising:
a first imaging device unit that is controlled in accordance with a first control signal so that an electric charge signal corresponding to an amount of light received by said first imaging device unit is generated and output from said first imaging device unit;
a first wiring circuit that transmits said first control signal to said first imaging device unit;
a second imaging device unit that is controlled in accordance with a second control signal so that an electric charge signal corresponding to an amount of light received by said second imaging device unit is generated and output from said second imaging device unit;
a second wiring circuit that transmits said second control signal to said second imaging device unit; and
a single IC chip board provided with said first and second imaging device units and said first and second wiring circuits, wherein said first and second wiring circuits are connected to each other and to a common terminal on said IC chip board, and wherein said first and second wiring circuits transmit a third control signal, which is common to said first second imaging second imaging device units.

9. An imaging device arrangement, comprising:
a single IC chip board provided with a common terminal;
a first imaging device unit mounted on said IC chip board, said first imaging device unit being controlled in accordance with a first control signal to generate a first video signal;
a first wiring circuit that supplies said first control signal to said first imaging device unit, said first wiring circuit being connected to said common terminal;
a second imaging device mounted on said IC chip board, said second imaging device being controlled in accordance with a second control signal to generate a second video signal; and
a second wiring circuit that supplies said second control signal to said second imaging device unit, said second wiring circuit being connected to said common terminal, wherein said IC chip board is provided with a signal output terminal, by which said electric charge signal is output from a focus condition sensing device, and a control permission signal input terminal, by which a control permission signal that permits a control of said first and second imaging device units is input to the focus condition sensing device, said first and second wiring circuits being connected to a terminal other than said signal output terminal and said control permission signal input terminal.

* * * * *